Figure 1:
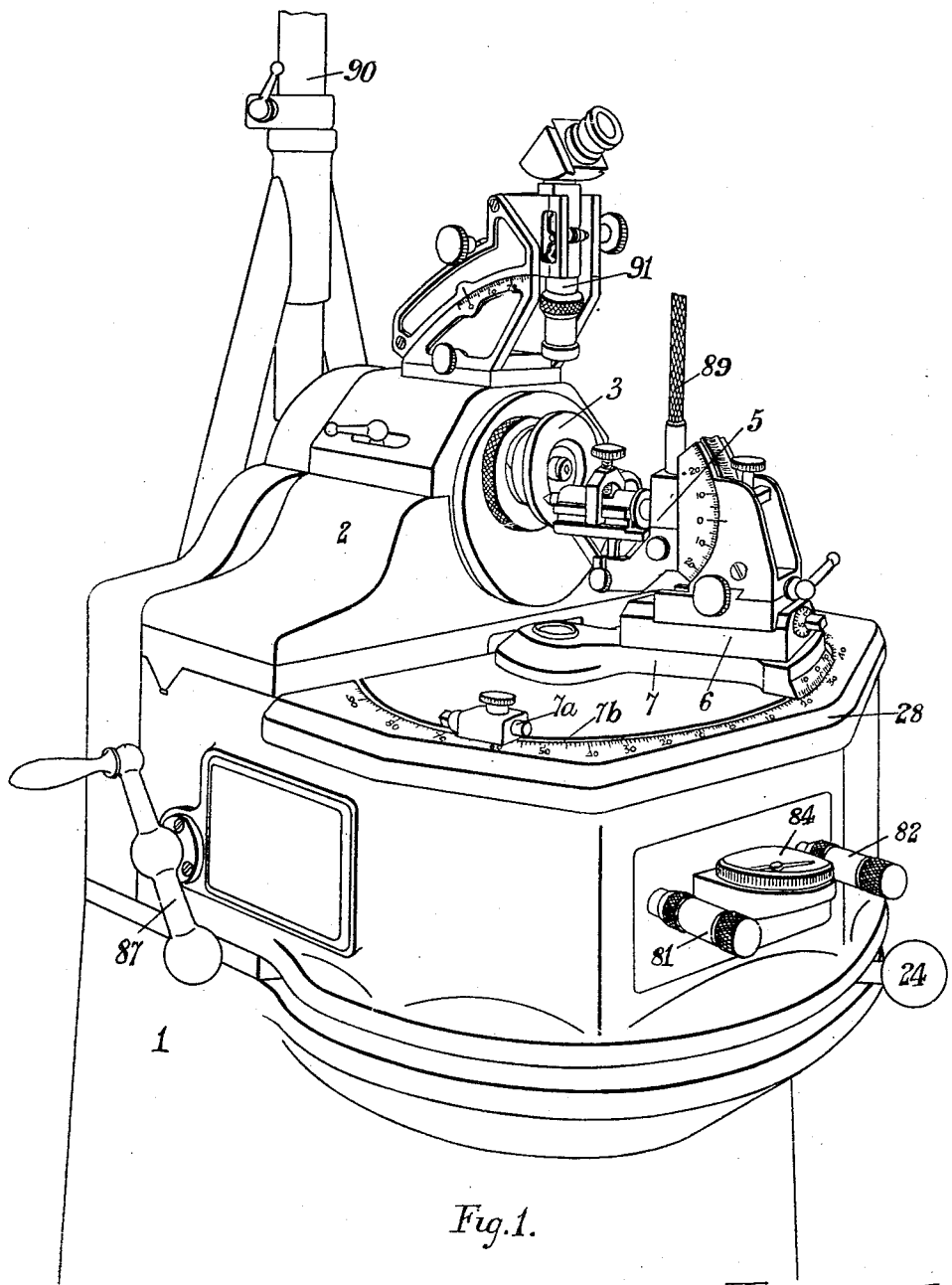

Oct. 21, 1947.  F. C. JEARUM  2,429,464
LAPPING MACHINE FOR GENERATING DIAMOND SHAPES
Filed Oct. 9, 1944  8 Sheets-Sheet 1

Inventor
F. C. Jearum

Oct. 21, 1947.  F. C. JEARUM  2,429,464
LAPPING MACHINE FOR GENERATING DIAMOND SHAPES
Filed Oct. 9, 1944  8 Sheets-Sheet 3

Inventor
F. C. Jearum

Oct. 21, 1947.  F. C. JEARUM  2,429,464
LAPPING MACHINE FOR GENERATING DIAMOND SHAPES
Filed Oct. 9, 1944  8 Sheets-Sheet 6

Inventor
F. C. Jearum
By Glascock Downing Lutz
Attys.

Oct. 21, 1947.  F. C. JEARUM  2,429,464
LAPPING MACHINE FOR GENERATING DIAMOND SHAPES
Filed Oct. 9, 1944   8 Sheets-Sheet 7

Inventor
F. C. Jearum

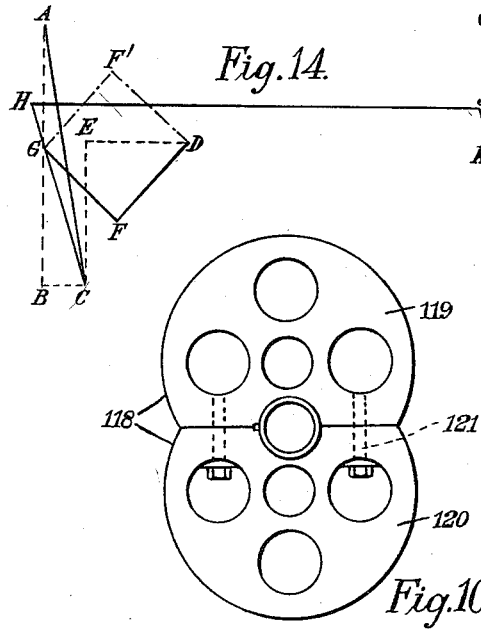
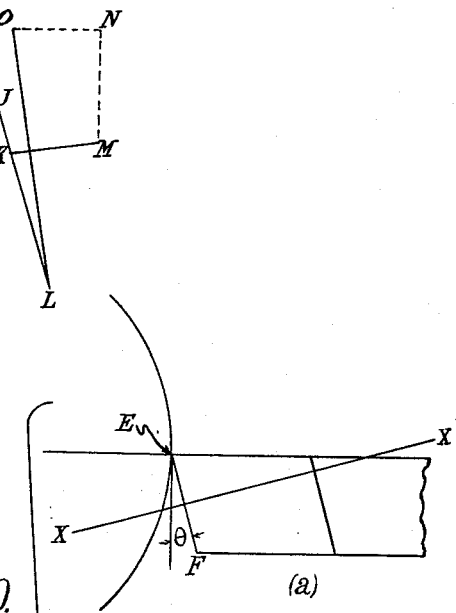
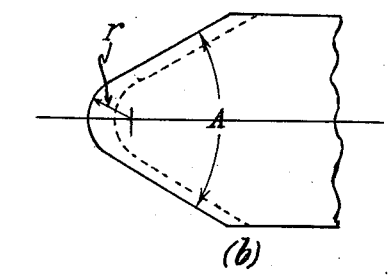

Patented Oct. 21, 1947

2,429,464

UNITED STATES PATENT OFFICE 2,429,464

LAPPING MACHINE FOR GENERATING DIAMOND SHAPES

Frederick Charles Jearum, Sutton, England

Application October 9, 1944, Serial No. 557,856
In Great Britain May 12, 1944

13 Claims. (Cl. 51—127)

This invention, relates to machines or mechanism for cutting, grinding, lapping or polishing (hereinafter referred to as cutting) diamonds or other stones or minerals or hard tool metals for industrial tool work or for the jewellery trade, of the type in which the work is held in dop mounting and means are provided for giving the dop an operational arcuate oscillatory displacement in a plane normal or at a suitable angle to the cutting plane of a rotating disc or skaife (hereinafter referred to as a cutting disc). The invention may also be applied to what is known as "bruting" by the provision of a suitable form of cutting disc.

An object of the present invention is to provide a machine capable of cutting diamonds, or other stones, minerals or hard tool metals, wherein means are provided which mechanically control the generation of curved or spherical or domed faces, radiussed points or corners, or compound shapes combining different curved forms or curved forms and rectilinear portions, or to generate any shape or form within the limits afforded by the operative displacements and adjustments provided by the invention.

In addition to work of the above character the improved machine may be used for the generation of conical, pyramidal or faceted forms or other shapes.

For the normal routine work where a diversity of forms or shapes are from time to time to be generated hand power operation is adequate for giving the diamond or the like the operational controlled displacements for the generation of the predetermined shape or form. Where mass production or repetition work is concerned hand power may be replaced by motor power by any suitable known means for actuating the mechanically controlled operational displacement means according to the invention.

The structure of a diamond is such that it is capable of being cut only when the abrasive grains pass in a certain directional sense relative to the grain or cryalline structure. This directional sense is known as the "polishing" or "cutting grain" of the diamond. Accordingly, it is necessary in order to obtain cutting action upon a diamond, unless the cutting grain be preselected by the operator, to provide a relative cyclic displacement between the cutting disc and the diamond to be cut along a path (parallel with the cutting plane) comprising components of motion in two planes at right-angles to one another such that the cutting grain of the diamond is automatically found at least twice in each cycle. Although other displacements comprising the desired components may be employed it is preferred to utilise a planetary or orbital motion which has been previously proposed for the automatic grain-finding cutting of diamonds wherein the cutting disc in addition to being rotated about its own axis revolves in an orbital or planetary path.

It will be appreciated that in applying the invention to the bruting of diamonds or other stones and to the cutting of minerals or hard metal tools where there is no problem concerned with the cutting grain as with the diamond, that it is not necessary to employ a grain-finding orbital displacement of the cutting disc for materials other than diamonds, and that for such materials the invention may be carried out in conjunction with any of the usual arrangements of cutting disc. It will be understood, however, that a planetary cutting disc has the advantage that it can be used for all materials and hence a machine employing such is of universal application.

Concerning the various shapes or forms to be generated, it is an object of the invention to provide a machine or mechanism of the type indicated with means by which the operator in oscillating the dop is caused to subject the diamond or other stone or mineral or hard tool metal (hereinafter referred to for convenience broadly by the term "stone") to a mechanical control adapted to generate certain arcuate shapes or convex contours which cannot be produced by displacement in a path which is the true arc of a circle. For example, certain tools require radiussing and where these tools are undercut or have a clearance angle treatment by oscillation in a true circular arc results in the radiussed contour or edge (owing to the clearance angle cant of the stone) being elliptical. This elliptical form is unsuitable for work where a true circular arc cut or contact is required, for example, in preparing the root arcs of a tooth grinding wheel. The invention enables such work accurately to be done and provides also means whereby a variety of exact forms may be generated (including compound forms combining different curves or curves and rectilinear portions, such as for example a tool having a cutting edge at right-angles to its axis flanked by bevelled or inclined edges and having circular arc radiussed portions at the junction of the flanking edges and the intermediate cutting edge) in a mechanically controlled manner hitherto unattainable and in which the reaction between the stone and cutting disc does not develop undesirable component forces tending to induce an infeed or a binding of the stone against the cutting disc.

The invention consists in a mechanism for cutting diamonds and the like, of the type described comprising: a machine stand, a cutting disc rotatably mounted on the stand with the cutting plane vertical, and rotary drive means for the disc; a horizontal table mounted on said stand in front of said cutting disc; a radial arm having at one end a vertical pivotal shaft mounted in bearings in said table; dop mounting means on said radial arm for holding the stone to be treated, the arrangement being such that the radial arm, dop mounting means and stone may be oscillated in an arcuate path about the axis of said pivotal shaft with the stone in cutting contact with the disc; a parallel link motion mounting for the table including leg frames pivotally supported on a pair of lower horizontal shafts which are in turn hung by parallel links from upper horizontal shafts mounted in the machine stand; modifying means for altering the path of the stone with respect to the cutting disc during oscillation of the radial arm, consisting of a former mounted on said pivotal shaft and an abutment member mounted for engagement by the former, the arrangement of the former and abutment being such that rotation of the former upon the abutment due to oscillation of the pivotal shaft and radial arm causes the displacement of the table and radial arm pivotal axis towards or away from the cutting plane to modify the said path, to afford cutting contact loci for the stone at the cutting disc as determined by said modifying means.

By "former" as used herein and in the claims is meant a cam or body operating as a cam which when rotated upon a relatively fixed abutment causes the displacement of the part to which the former is connected, in accordance with the shape of the former at the plane of contact with the abutment. A cylinder, the axis of which is inclinable to the axis of rotation by rotating the cylinder about an axis normal to the cylinder so that it presents an elliptical contact track to the abutment, constitutes an example of a body operating as a cam, the different angles of inclination available affording a large variety of elliptical camlike forms.

By "abutment member" as used herein and in the claims is meant a linear edge or elongated surface such as the longitudinal face of a bar mounted adjacent the former so that the latter may be rotated against the abutment face.

The modifying means arrangement may be such that the displacements effected between the abutment and the axis of the former are reproduced in unitary proportion in the shape to be generated or, in other words, the displacement of the stone (towards or away from the cutting disc) during the arc of oscillation is the same as the displacement between the abutment and the axis of the former. Alternatively, the arrangement may be such that the displacements between the abutment and the axis of the former are substantially larger than such as are required at the stone to generate the desired shape and are reproduced at the stone through the medium of reducing means to give the stone the displacements in the exact amounts necessary for generating the desired shape, for example the desired reduction ratio may be attained by the interposition of a reducing leverage.

The abutment may be carried upon lever means operatively connected to the table support and the former is carried by the table support, the fulcrum of said lever means being anchored to a fixture.

Further features of the invention will be hereinafter described and defined in the claims.

The accompanying drawings illustrate a mode of carrying the invention into effect, by way of example, for cutting stones including diamonds, that is to say, a machine wherein means for giving a dop operational displacements and adjustments appropriate for the generation of the desired form are exemplified in conjunction with mechanism for giving the cutting disc a planetary movement in relation to the dop such that when treating a diamond the cutting grain thereof is automatically found.

It will be appreciated that when a machine is required solely for cutting stones other than diamonds it is not necessary, although it may be advantageous, to employ a cutting disc having an automatic grain finding planetary motion and it will be observed that a machine embodying such planetary cutting disc or other means for automatically finding the cutting grain may be constructed as a standard machine for all classes of work.

Figure 2:
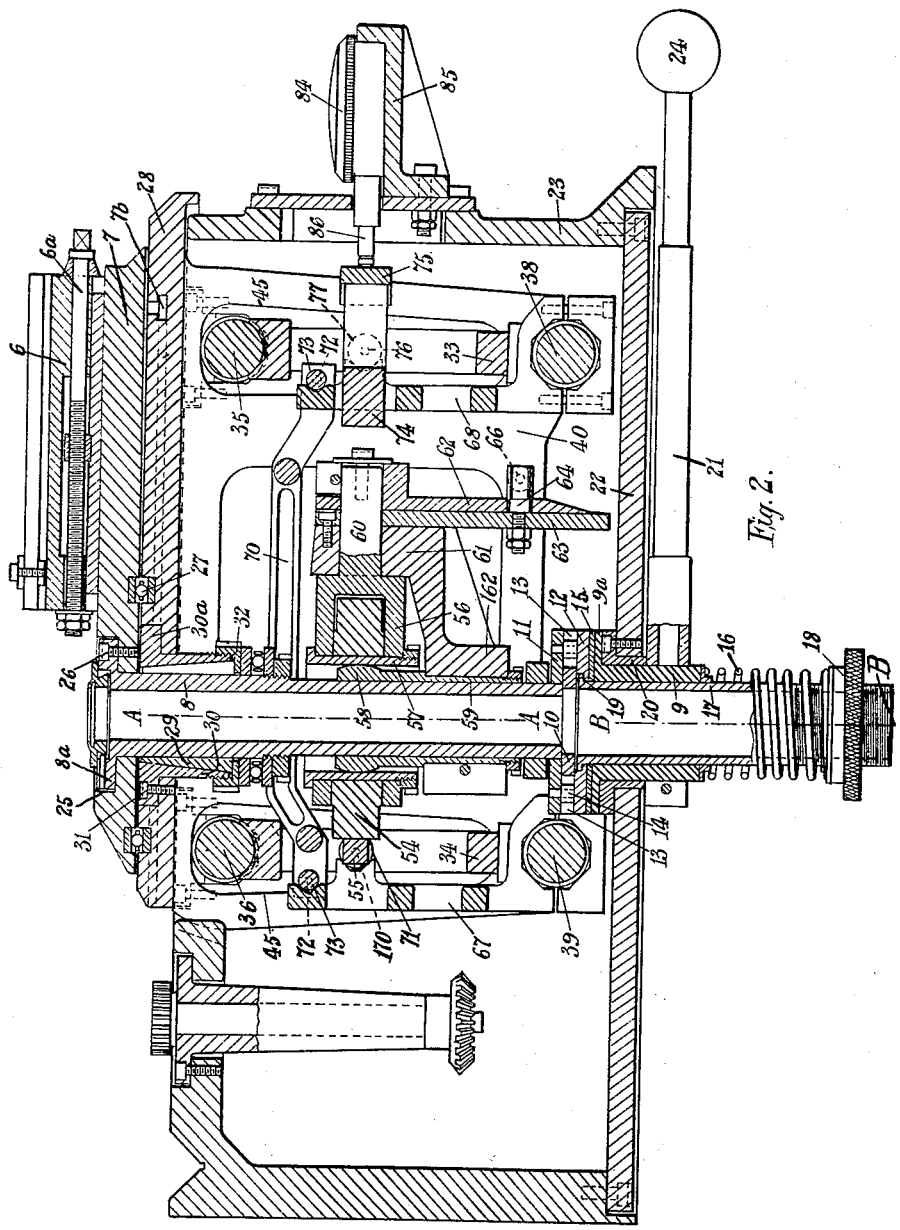
Figure 3:
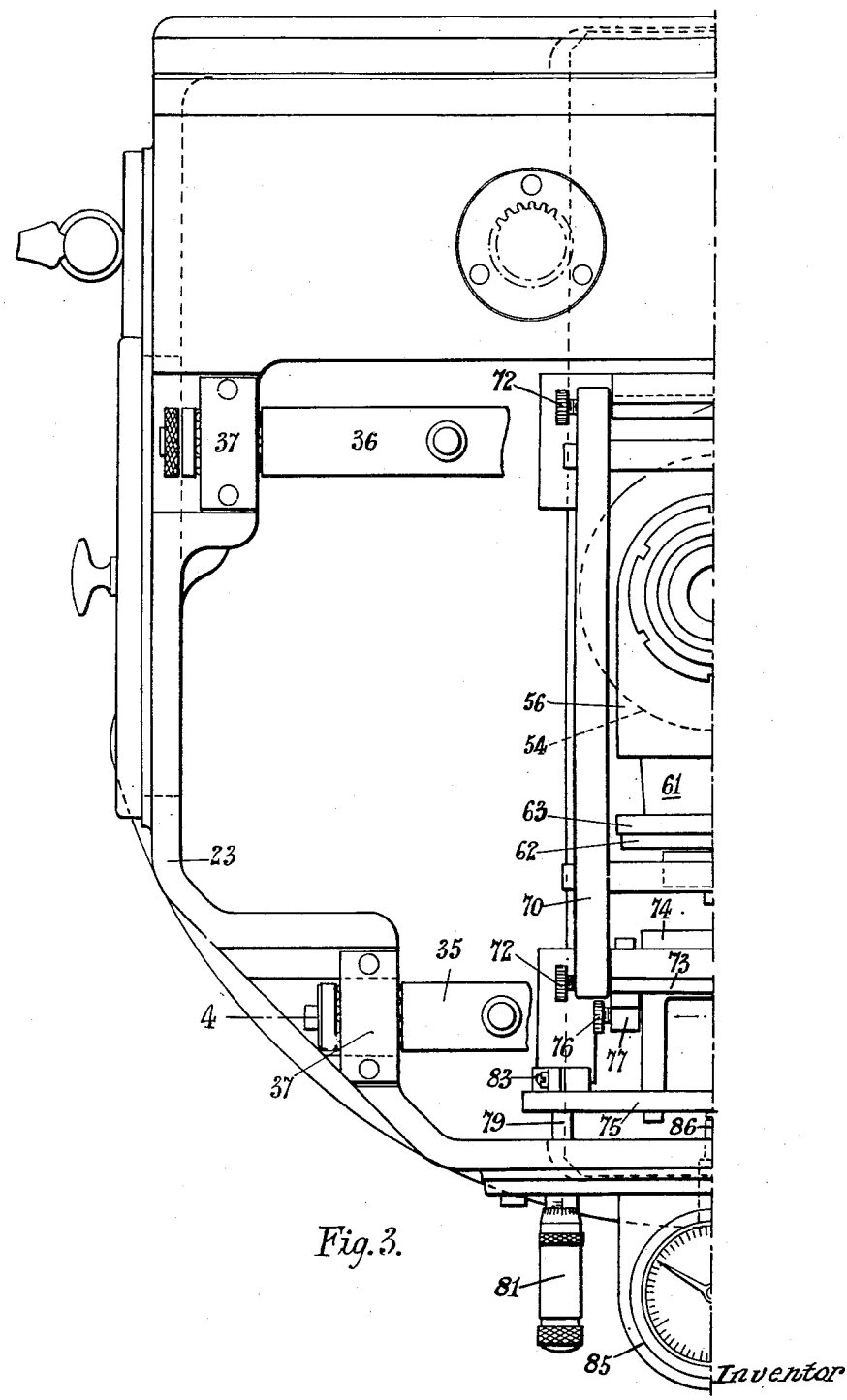
Figure 3A:
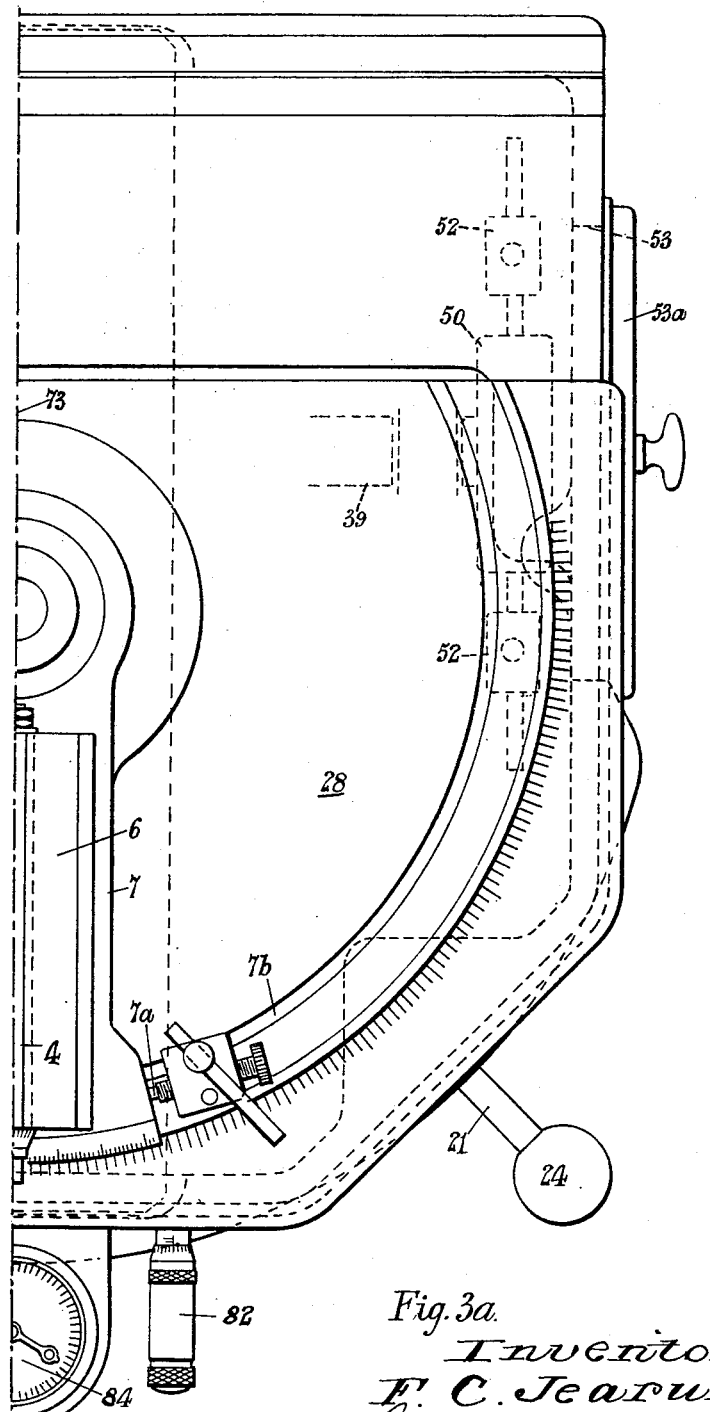
Figure 4:
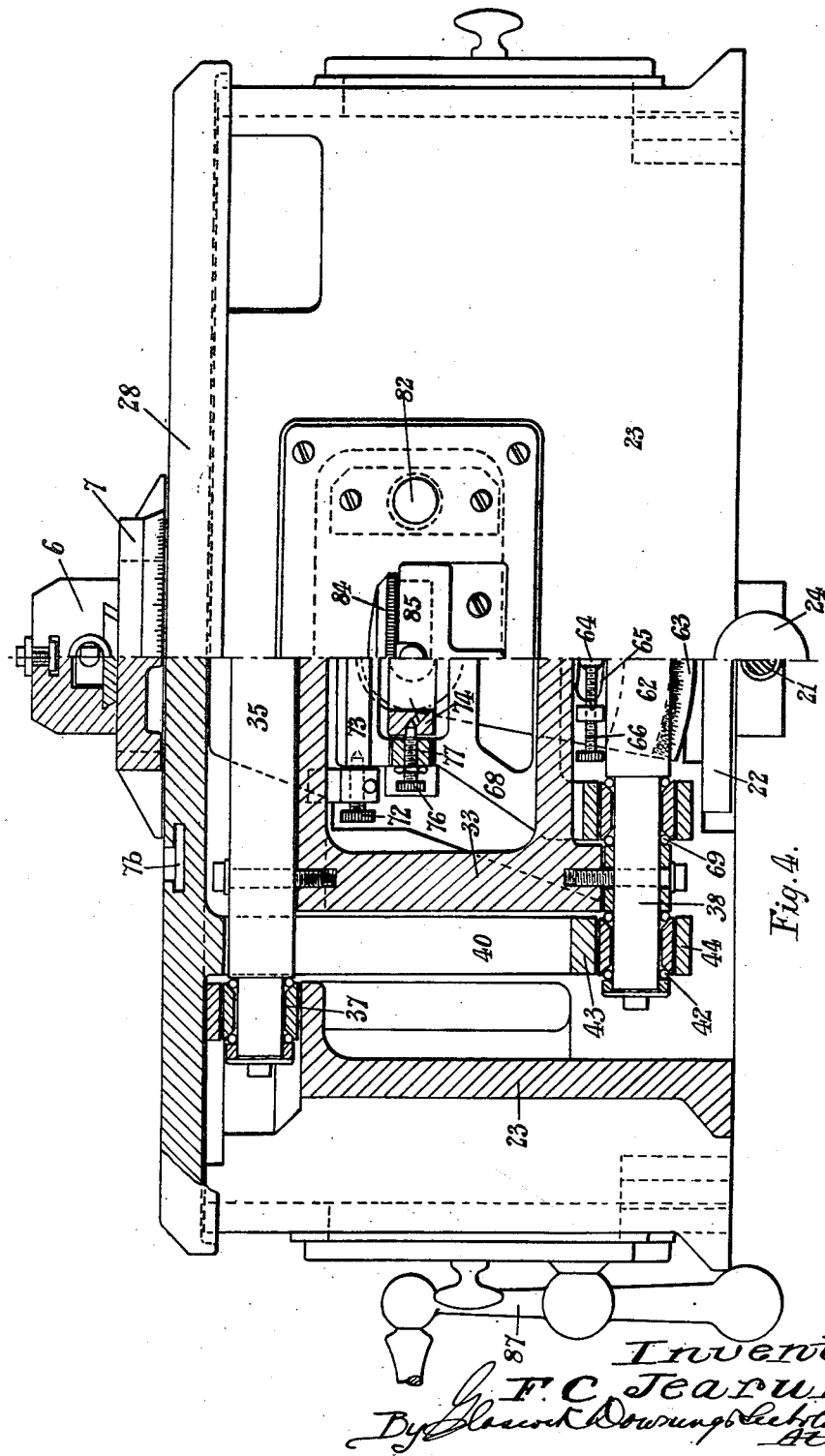
Figure 5:
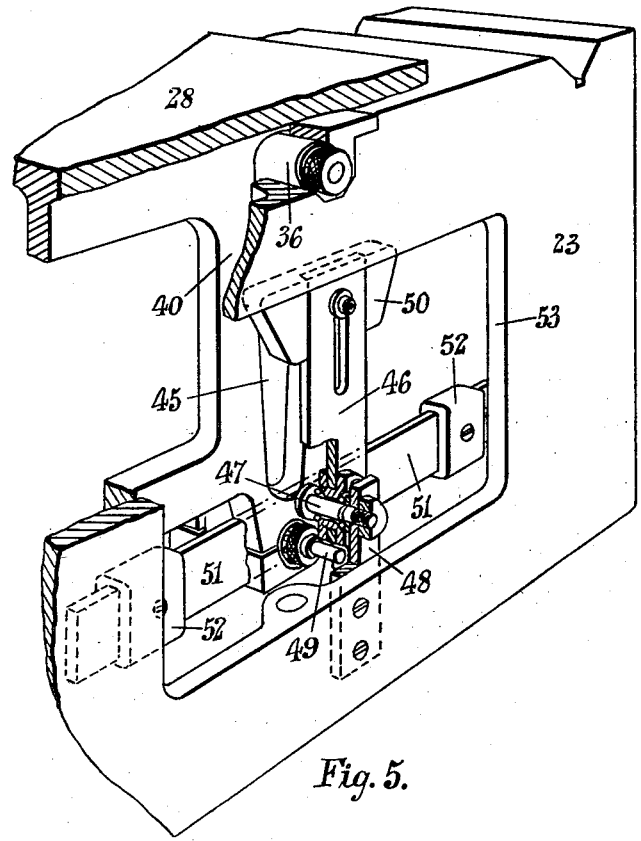
Figure 6:
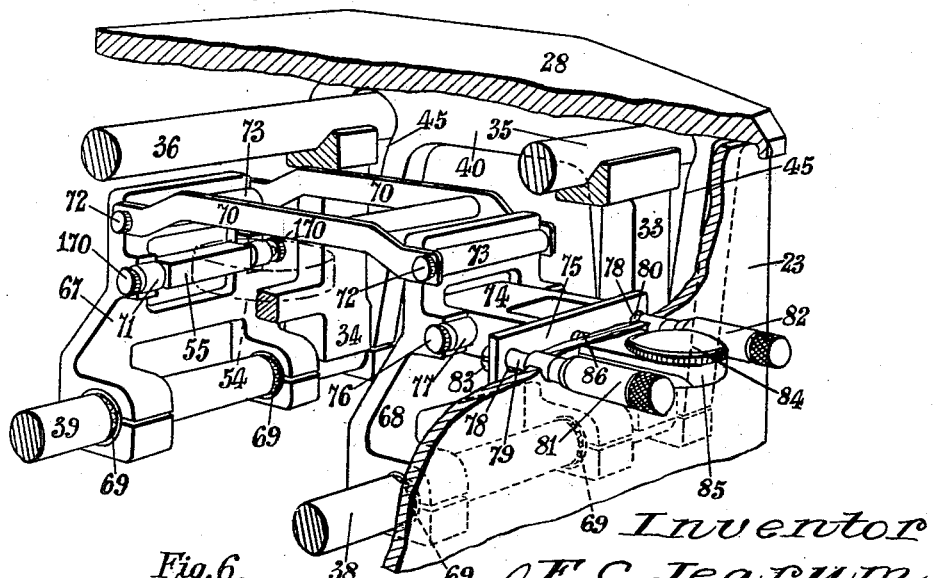
Figure 7:
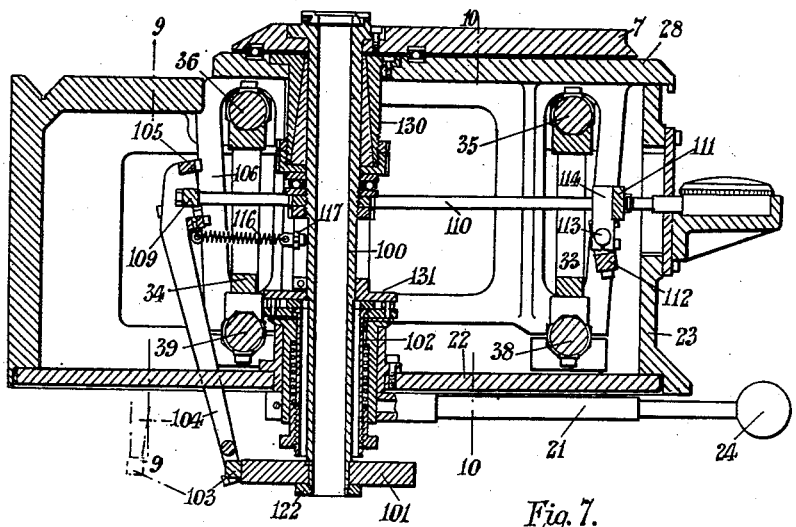
Figure 8:
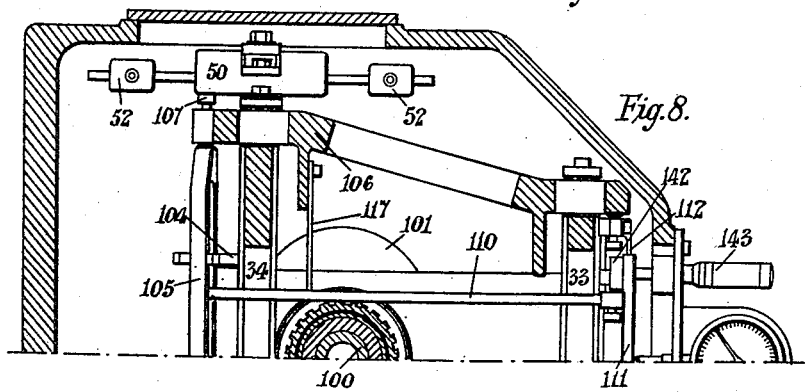
Figure 9:
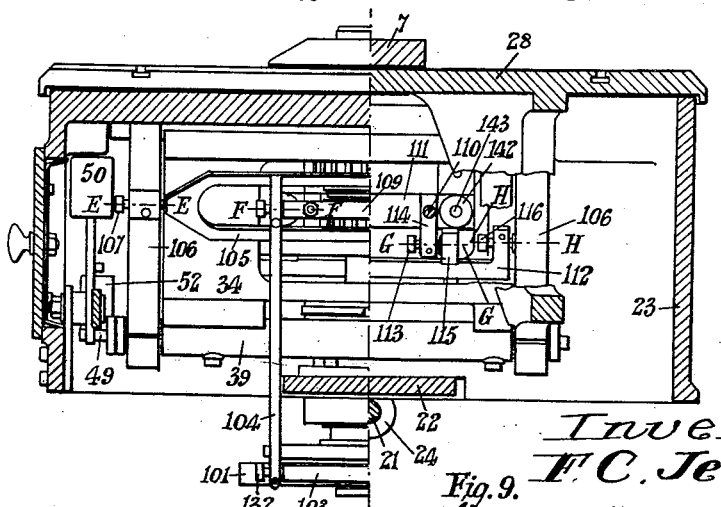

In the accompanying drawings:

Figure 1 is a perspective view of part of a machine embodying the invention,

Figure 2 is a sectional side elevation of a machine according to one form of the invention, Figures 3 and 3a comprise a plan view, the right-hand half, Figure 3a, being an outside view, the left-hand half, Figure 3, having the upper parts removed, Figure 4 is a front view, the right-hand half being an outside view while the left-hand side is a section on line 4—4 of Figure 3, Figure 5 is a perspective view showing the counterbalancing arrangements for the table, Figure 6 is a perspective view of the table suspension, Figure 7 is a sectional side elevation of a modified form of machine, Figure 8 is a half plan corresponding thereto, Figure 9 is a sectional elevation from the rear of the machine taken on the lines 9—9 and 10—10 of Figure 7, and Figure 10 is a plan of a construction of cam, Figures 11 to 14 are diagrams relating to the theory concerned with the generation of an elliptical form on the tip of a diamond having a clearance angle.

In carrying the invention into effect according to one mode adapted to provide a standard machine capable of cutting all stones including diamonds, a stand 1 has at the upper end a planetary cutting disc mounting 2 for a cutting disc 3 at the rear side and mounting means at the front side for the dop and for giving it the required operational displacements and adjustments.

The dop mounting 5 is mounted upon and locked to an adjustable slide 6 carried by the radial arm 7 which is attached to the upper end of a hollow shaft 8.

The hollow shaft 8 is located on a vertical axis A—A about which it is oscillable for imparting an oscillatory movement to the stone in an arcuate path about said axis. The axis A—A lies in the vertical cutting plane of the cutting disc 3 when the machine has been adjusted for operation.

For the purpose of oscillating the hollow shaft 8 about the axis A—A, the shaft at its lower end is coupled to a sleeve 9 by means of an Oldham coupling comprising a floating disc 10 located between discs 11 and 12, the disc 11 being secured to the shaft 8 while the disc 12 is adapted to be frictionally rotated from the sleeve 9. The floating disc 10 is provided with radial grooves 13 on diameters at right angles. Into one set of grooves rollers 14 on the disc 11 project while in grooves at right angles similar rollers on the disc 12 project.

The sleeve 9 is provided with a flange 9a between which and the disc 12 a friction driving element 15 is provided. The necessary pressure between the element 15 and the disc 12 is provided by a spring 16 located on a sleeve 17 which passes through the sleeve 9, said spring abutting against an adjustable nut 18 on the sleeve 17 and the end of the sleeve 9. The sleeve 17 is provided with a flange 19 seating in a recess in the disc 12.

The sleeve 9 is capable of oscillation in a bearing 20 about a fixed axis B—B by means of a rod 21 secured to the sleeve 9. The bearing 20 is carried by a cross plate or bar 22 secured to the box or casing 23.

When the rod 21 having a knob 24 is moved the oscillations of the sleeve 9 are communicated through the friction drive and Oldham coupling to the hollow shaft 8 whereby the radial arm 7 is oscillated carrying with it the dop mounting.

The extent of oscillation of the arm 7 is limited in either direction by adjustable stops 7a, located in an arcuate groove 7b.

The hollow shaft 8 is supported by the radial arm 7 by means of a flange 8a which is seated in a recess 25 in the radial arm, screws 26 securing the shaft to the arm. An anti-friction bearing 27 is provided between the radial arm 7 and a table or mounting 28 by which the shaft 8, radial arm 7 and dop mounting are carried.

The location of the shaft 8 laterally with respect to the table 28 is obtained by means of a bearing comprising a split coned element 29 surrounding the shaft 8 and seated within a complementary bearing sleeve 30 depending through an aperture in the table. The bearing sleeve is provided with a flange 30a seated in a recess in the table and secured by screws 31.

The tightness of the coned element 29 within the bearing 30 is adjustable by a screwed cap 32.

The table 28 is mounted so that it may move towards and away from the cutting disc 3 and for this purpose it is supported upon parallel link suspension means comprising front and rear suspension links or frames 33 and 34. These links or frames are secured to front and rear upper shafts 35 and 36 which are supported at their ends in ball bearings 37 mounted in the box or casing 23.

At their lower ends the links or frames 33 and 34 are secured to front and rear lower shafts 38 and 39 so that these shafts may swing about the axes of the upper shafts 35 and 36.

The table 28 is provided with depending leg formations 40 and 41 at either side and such formations are seated upon the lower shafts 38 and 39 by means of ball bearings 42 secured within seating recesses 43 of the legs 40 and 41, and cap pieces 44. The leg formations 40, 41 of the table are provided with apertures 45 through which the upper shafts 35, 36 pass and which allow for the movement of the table relatively to such shafts. By such suspension the table is provided with a substantially frictionless mounting for movement towards and away from the cutting disc.

The table 28 is provided with counterweight means acting in opposition to the tendency of the table to return to its normal position of rest when displaced therefrom away from the cutting disc 3.

The counterweight means comprises an upwardly extending arm 46 (Figure 5) pivotally mounted by ball bearing means 47 on a bracket 48 secured to the box or casing 23. The arm 46 is slotted below the pivot of the arm and projecting into the slot is a pin 49 extending from one end of the rear lower shaft 39. The arm 46 carries an adjustable weight 50. Secured to the arm 46 is a horizontal arm or bar 51 which extends on either side of the pivotal axis of the arm 46. The arm 51 carries a pair of adjustable weights 52 providing means whereby the balanced table mass may be given a predetermined bias towards the cutting disc to afford a predetermined substantially constant cutting pressure.

The side of the casing 23 is provided with an aperture 53 closable by a door or panel 53a for giving access to the weights for adjustment purposes.

The means for controlling the modifying movements of the table 28 comprises a cylindrical former 54 coaxial and movable with the hollow shaft 8, and an abutment member 55.

The former 54 is carried by a forked member 56 and is centred by a sleeve 57 carried by the fork. The sleeve 57 surrounds the shaft 8 in spaced relation thereto and its inner surface engages the spherical or ball end 58 of a sleeve 59 mounted on the shaft.

The fork 56 is provided with a stub shaft or spindle 60 the axis of which is at right angles to and passes through the axis of the hollow shafts. The stub shaft is seated in a bearing bracket 61 which is mounted on the shaft 8 to move therewith, being provided with a split sleeve 162 by which it grips the reduced part of the sleeve 59 which in turn grips the shaft 8.

The former 54 is adapted to have its axis canted with respect to the axis of the shaft 8 by a movement about the axis of the stub shaft 60. For this purpose the shaft 60 has secured thereto an arm 62 adapted to move over a plate 63 secured to the bracket 61, the arm and plate having vernier scales for determining the movement required.

The plate 63 is provided with a post 64 projecting through a slot 65 in the arm 62. The post co-operates with a pair of adjusting screws 66 carried by the arm 62 so that the fork and the former may be adjusted and locked in their adjusted position.

The centre of the spherical end 58 coincides with the intersection of the axis of the shaft 8 and the canting axis of the former 54.

The abutment member 55 comprises a bar of square cross section pivotally mounted in a frame carried by the lower shafts 38, 39. The frame comprises a pair of upright frame elements or levers 67, 68 (see Fig. 6) which are supported by means of ball bearings 69 on the shafts, and link members 70 which are pivotally connected to the upper ends of the levers 67, 68. The levers 67, 68 lie parallel to one another, the distance between the pivot centres of the links 70 being equal to the distance between the centres of the shafts 38, 39.

The pivots for the abutment member 55 comprise cone pointed screws 170 threaded in blocks 71 secured to the frame element 67 and extending into the ends of the abutment member.

Similarly arranged pivot screws 72 extending into bars 73 secured to the frame elements 67, 68 provide the pivotal connections between the frame elements and the link members 70.

The frame element 68 has pivotally mounted thereon a U-shaped block 74 to the legs of which an anchorage plate 75 is secured. The block pivots on screws 76 threaded through blocks 77 secured to the frame element 68.

The plate 75 is provided with a pair of spaced holes 78 through which extend the adjustable stems 79, 80 of a pair of micro screw or stop devices 81, 82. The micro screw devices are secured within apertures in the casing or box 23. The stems 79, 80 of the micro screws have collars 83 secured therein and adapted to engage the rear face of and form stops for the anchorage plate 75. The collars 83 are spherically seated on the plate 75.

The line joining the pivot centres of the abutment 55 and the U-shaped block 74 lies parallel with a line joining the centres of the shafts 38, 39 and coincides with the axis of the former mounting 60.

One micrometer 81 controls the feeding movement of the table 23 in the direction of the cutting disc while the other micrometer 82 is adapted to be preset to a predetermined value and arrests the movement of the table towards the cutting disc when such value has been reached.

A dial gauge 84 is mounted on a bracket 85 secured to the casing 23 and the stem 86 of the dial gauge engages the front face of the plate 75 giving a visual indication of the motion of the table 28.

The cutting disc 3 is mounted for rotation and for planetary movement and is capable of axial movement relatively to the saddle or mounting 2 by suitable screw adjustment means. The saddle is also adjustable parallel to the plane of the cutting disc by the handle 87 through gearing 88.

The mounting and planetary movement of the cutting disc is similar to that described in my application, Serial Number 488,783 which is now Patent 2,384,253.

Various forms of dop may be clamped in position on the slide 4, that shown in Figure 1 being designed for lapping conical and spherical shapes and being driven by a flexible drive 89 from a motor (not shown) mounted on the support 90.

The microscope 91 allows the stone to be examined at a suitable magnification while illuminated by a light source situated in the base of the machine and directed vertically through the hollow shaft 8.

The mode of setting up the machine for lapping, as an example, a conical diamond having a 120° included angle with a spherical tip of 2 mm. radius, will now be described.

The table is first allowed to move towards the cutting disc by turning the micro stop 81, until the table is arrested by the micro stop 82 previously set at zero.

The cutting disc is then adjusted until the face of the cutting disc is in line with the centre of the cross line in the glass.

The micro stop 82 is then set to the required radius of 2 mm. and the stops are set so that the radial arm can swing to 60° either side of zero.

The diamond already set in its shank is inserted in the dop quill and securely clamped.

With the radial arm 7 at one extremity of its swing the diamond is fed forward by the micro screw 81 until it contacts with the cutting disc as observed through the microscope, and the reading noted on the dial indicator 84. The radial arm is then swung to the other extreme and the reading noted on the indicator 84. Assuming that the diamond is coincident with the axis of the pivotal shaft 8 the two readings will be the same. If there is a difference the diamond is shifted over to bring it into coincidence with the pivotal axis by known lateral adjustment of the dop mounting means.

When these conditions are obtained the diamond should be retracted clear of the cutting disc by the micro stop 81.

The micro stop is then turned very slowly until the diamond touches the cutting disc, the drive of which in the meantime has been started.

The handle 24 is then swung from side to side against the stops until there is no visible deflection on the dial gauge 84 throughout the swinging movement. The micro stop is then adjusted slightly and the operation repeated until further adjustment of the micro stop shows no further deflection of the gauge 84.

If the diamond has not completely cleaned up, the micro stop 81 is retracted and the diamond brought slightly forward by the micro screw 6a and the whole operation repeated.

During the lapping operation it will be appreciated that the table 28 is biased to move toward the cutting disc to bring former 54 into contact with the abutment member 55, the position of the abutment member being controlled by the anchorage afforded by the plate 75, the position of which is adjusted during operation by the feed micro stop 81, and ultimately by the micro stop 82 which is preset to the dimension required.

By the feeding of the diamond to the cutting disc by the oscillation of the table normal to the plane of the cutting disc, the development of undesirable component force tending to induce an infeed or a bending of the diamond against the cutting disc is avoided irrespective of the angular position of the radial arm with respect to the plane of the cutting disc.

When it is desired to generate an elliptical form on the tip of a diamond so that when the diamond is in its working position with a front clearance angle it will form a true radius on the work, the former 54 is tilted about its horizontal axis by an adjustment of the thumb screws 66 which move the arm 62 the desired angle. It will be appreciated that the appropriate dop mounted for the purpose will replace the mounting 5 shown in Figure 1. By such arrangement during the oscillation of the radial arm a predetermined displacement of the axis of oscillation with respect to the cutting plane is automatically effected whereby the desired shape of the diamond is generated.

For setting up when it is desired to generate or cut circular arcs or cylindrical surfaces upon tools having a clearance angle, it is necessary to appreciate the theoretical bases of the modifying apparatus so that the former 54 may be adjusted according to the formulae hereinafter stated, reference being made to the diagram in Figures 11–14.

The generating mechanism is designed to generate an elliptical form on the tip of a diamond so that when the diamond is in its working position with a front clearance angle it will form a true radius on the work.

The generating mechanism consists essentially of the former 54 bearing on the square prism or abutment 55 with means provided for twisting the roller on an axis normal to that of the shaft 8.

Figure 11 shows the roller ABCD in contact with the square EFGH. The axis of twisting of the former 54 is parallel to the horizontal centre line of the radical arm 7, thus when the radial arm is set with the vernier reading zero on the graduations engraved on the table 28, the axis of twisting of the former will be normal to the plane in which lies the face of the cutting disc and therefore normal to the axis of the square prism XX, thus in this position the axis of twisting of the former will be the point O. If the former is twisted to the position A'B'C'D' the angle $\phi$ between the axis of the former YY and the axis of the shaft 8ZZ may be read on the vernier scale engraved on the quadrant 63.

Figure 12 is the elevation and plan of the former 54 set at an angle $\phi$ with the radial arm turned through an angle $\alpha=90°$ from zero. The axis of the former being YY, the axis of the shaft 8 ZZ, the axis of the prism 55 XX and the axis of twisting WW. It will be seen that since the prism is pivoted on its axis it will always be in line contact with the former, and therefore the perpendicular distance BA between the axis of the prism and that of the former will always equal the sum of the radius AC of the former and half the side of the square section of the prism BO for all values $\alpha$. Thus if the diameter of the former$=D$ and the side of the square section of the prism$=x$, then:

$$BA = \frac{D+x}{2}$$

If BO=the perpendicular distance between the axis of the prism and that of the shaft 8, then $$BO = \frac{BA}{\cos\{\tan^{-1}(\tan\phi \times \sin\alpha)\}}$$

Thus when $\alpha=O$, $BO=BA$, and therefore if $d$ is the horizontal displacement of the axis ZZ of the shaft 8 relative to the axis XX of the prism along the line BO, then $d=BO-BA$ $$\therefore d = \frac{D+x}{2}\left[\frac{1}{\cos\{\tan^{-1}(\tan\phi \times \sin\alpha)\}} - 1\right]$$

or $$d = \frac{D+x}{2}[\sec\{\tan^{-1}(\tan\phi \times \sin\alpha)\}] \quad (1)$$

In other words if the former is set at an angle $\phi$ and the radial arm 7 is swung to an angle $\alpha$ from zero, the table 28 and therefore the diamond will move back the distance $d$, found in the above equation.

Figure 13 (a) and (b) are exaggerated views of the diamond which is required to be formed with a front clearance angle $\theta$, included angle A and nose radius $r$. If the diamond has a positive or negative top rake, then a horizontal section through the diamond will have to conform with the plan view.

When the diamond is set up for lapping, the dop holder is tilted through the angle $\theta$ so that the line EF becomes vertical, thus the form to which the diamond must be lapped will be the section on XX, Figure 13 (c) where XX is normal to EF. It will be seen that the section XX will have an included angle of B, where:

$$\frac{B}{2} = \tan^{-1}\left(\frac{\tan\frac{A}{2}}{\cos\theta}\right) \quad (2)$$

and the nose will be part of an ellipse whose major axis$=2r$, and minor axis$=2r\cos\theta$, the minor axis lying in the centre line ZZ.

The cutting disc may be considered as a line YY tangential to the ellipse, and since the table 28 can only move normal to the face of the cutting disc, the perpendicular distance CO from the line YY to the point of intersection of the semi-axes of the ellipse (which is vertically above the centre of pivoting of the radial arm), will vary according to the angle $\alpha$ which is the angle through which the radial arm has been turned, where $$CO = r\cos[\tan^{-1}\{\sec\theta \times \sin(\tan^{-1}\overline{\tan\theta \times \cos\alpha})\}] \quad (3)$$

when $$\alpha=0, \quad CO=r\cos\theta$$

Thus if the horizontal displacement of O normal to the cutting disc $=d'$, then $$d' = r\cos[\tan^{-1}\{\sec\theta \times \sin(\tan^{-1}\overline{\tan\theta \times \cos\alpha})\}] - r\cos\theta$$

or $$d' = r(\cos[\tan^{-1}\{\sec\theta \times \sin(\tan^{-1}\overline{\tan\theta \times \cos\alpha})\}] - \cos\theta) \quad (4)$$

In other words to produce the required form on the diamond, if the radial arm 7 is swung to an angle $\alpha$ from zero the diamond and therefore the table 28 will have to move back the distance $d'$, found in the above equation.

It has already been shown that the table 28 can be moved a distance $d$ by the generating mechanism, where $$d = \frac{D+x}{2}[\sec\{\tan^{-1}(\tan\theta \times \sin\alpha)\} - 1]$$

Thus if the form required is to be generated, $d$ must equal $d'$ $$\therefore r(\cos[\tan^{-1}\{\sec\theta \times \sin(\tan^{-1}\overline{\tan\theta \times \cos\alpha})\}] -$$

$$\cos\theta = \frac{D+x}{2}[\sec\{\tan^{-1}(\tan\theta \times \sin\alpha)\} - 1]$$

or $$\frac{2r}{D+x} = \frac{\sec\{\tan^{-1}(\tan\theta \times \sin\alpha)\} - 1}{\cos(\tan^{-1}\{\sec\theta \times \sin(\tan^{-1}\overline{\tan\theta \times \cos\alpha})\}) - \cos\theta} \quad (5)$$

It will be seen from this equation that for any one value of $r$, $$\frac{D+x}{2}$$

and $\theta$, the equation will only be satisfied for two values of $\alpha$ for any one value of $\phi$, one of them being when $\alpha=0$.

When substituting in the equation to find the angle $\phi$ to which the former must be set, if $\alpha$ is made equal to B/2, then the curve generated on the diamond will coincide with that required, on either flank and at the centre, if $$\alpha = \frac{B}{2}$$

then $$\alpha = \tan^{-1}\left(\frac{\tan\frac{A}{2}}{\cos\theta}\right) \quad (6)$$

Substituting in Formula 5 we have:

$$\frac{2r}{D+x} = \frac{\sec\left(\tan^{-1}\left[\tan\phi \times \sin\left\{\tan^{-1}\left(\frac{\tan\frac{A}{2}}{\cos\theta}\right)\right\}\right]\right) - 1}{\cos\left\{\tan^{-1}\left(\sec\theta \times \sin\left[\tan^{-1}\left\{\tan\theta \times \cos\left(\tan^{-1}\left[\frac{\tan\frac{A}{2}}{\cos\theta}\right]\right)\right\}\right]\right)\right\} - \cos\theta}$$

$$\frac{\sqrt{\dfrac{\cos^2\theta + \tan^2\frac{A}{1}\sec^2\theta}{\cos^2\theta + \tan^2\frac{A}{2}}} - 1}{\sqrt{\dfrac{\sec^2\frac{A}{2}}{\tan^2\frac{A}{2}+\sec^2\theta}} - \cos\theta} \quad (7)$$

*Example.*—It is required to generate a diamond tip having a true radius of .010" and an included angle of 60° with a front clearance of 10°.

We know that $$\frac{D+x}{2} = 2.000''$$

and $$r = .010''$$
$$\theta = 10°$$
$$A = 60°$$

From Formula 7 we have $\phi = 0°\,42'$. The roller is therefore set at an angle of 0° 42'.

From Formula 3 when $\alpha = 0$ we have $$CO = r\cos\theta$$

former being turned through 90° from zero with the former twisted at an angle $\phi$. Thus if $$GF = ED = \frac{D+x}{2} =$$

the horizontal distance of the axis of the shaft 8 from the centre line of the shaft 38, and GFD is a right angle then FDE=90°−$\phi$ with the radial arm one side of zero and FDE=90°−$\phi$ with the radial arm the other side of zero. Also the vertical distance EC of the axis of twisting of the former from the centre line of the shaft 38 is equal to the centre distance GC of the axis of the prism to that of the shaft 38. Thus $$\phi = \cos^{-1}\left\{\frac{}{\sqrt{(ED-DN+BC+KM\sin x)^2 - (GC+NM-\sqrt{AC^2-BC^2}+KM\cos x)^2}}\right\} \pm$$

$$\cos^{-1}\left\{\frac{ED-DN+BC+KM\sin x}{GC+NM-\sqrt{AC^2-BC^2}+KM\cos x}\right\}$$

where $$x = \cos^{-1}\left\{\frac{KM^2 + (\sqrt{AC^2-BC^2}-NM)^2 + (ON-BC)^2 - GC^2}{2KM\sqrt{(\sqrt{AC^2-BC^2}-NM)^2}}\right\} + \tan^{-1}\left\{\frac{ON-BC}{\sqrt{AC^2-BC^2}-NM}\right\} \quad (9)$$

now $CO = d$ where $d$ is the value to which the micrometer head 82 must be set $$d = r\cos\theta \quad (8)$$
$$= .0098''$$

From Formula 2 we have $$\frac{B}{2} = 31°\,34'$$

Thus the stops 7a are set so that the radial arm can swing to 31° 34' from zero either side.

The machine is then ready for operating.

Figure 14 is a diagrammatical representation of the generating mechanism where O and A are the centre lines of the shafts 35 and 36, L and C are the centre lines of the shafts 38 and 39, CH and LJ are the frames 34 and 33, HJ is one of the straps 70 pivoted to the frames at J and K, G is the axis of the square prism or abutment 55, K is the axis of pivoting of the block 74, N is the centre of radius of the spherical seating between the plate 75 and the collar clamped to either micrometer spindles 81 or 82, and D is the point of intersection of the axis of twisting of the former and that of the vertical shaft 8.

In the diagram the table 28 is displaced a distance BC, due to the radial arm 7 and thus the From Formula 1 when $\alpha = 90°$ we have $$\frac{D+x}{2}(\sec\phi - 1)$$

thus if $$\frac{D+x}{2} = 2.000''$$

and we take $d = .010''$ which is approximately the maximum value that will be required, then $$\phi = 1.005''$$
$$\therefore \phi = 5°\,43'\,5''$$

Substituting in Formula 9 with $\phi = 5°\,43'\,5''$, AC=5.000", GC=3.000", ED=2.000", ON=.750", KM=.750" and NM=1.9988. We have BC= .0099526" or .0100368", which means that there is an error introduced into the form generated which is in the order of .0000106" which in itself may be neglected, but since the displacement is more likely to be in the order of .0001" (see example) the error will be less than .0000001" or one ten-millionth of an inch.

The other error introduced is the shifting of the axes of the ellipse along its major axis, to the order of .000042". Now if the diamond is set up in the dop as previously described, with the former already set at the angle required, this error will be automatically compensated for in the setting up—apart from the fact that the error is too small to measure.

In the above described form of the invention the modifying displacements effected between the abutment and the axis of the former are reproduced in unitary proportion in the shape to be generated; such displacements may however be substantially larger than those required and be reproduced at the diamond by reducing means and such a modified form of the invention will now be described with reference to Figures 7 to 10.

The table 28 is suspended in the same manner as in the previous example upon lower shafts 38, 39 which are hung from the upper shafts 35, 36 by the frame elements 33, 34.

The hollow shaft 100 to which the radial arm 7 is attached is mounted in a bearing 130 in the table 28, and extends through the Oldham coupling 131 and the sleeve 9 and below the bar 22 of the box or casing. At its lower end the shaft 100 has attached thereto a replaceable former 101 which in this is a cam. The shaft 100 passes through the sleeve 102, on which the sleeve 9 is mounted, with sufficient clearance to accommodate the full movement of the table 28. The bearing 130 and Oldham coupling 131 are of similar construction to those in the previous modification.

The abutment member 103 which is adapted to engage the former 101 comprises a square cross section bar which is pivotally mounted by screws 132 in the lower ends of a pair of spaced levers or arms 104. The upper ends of the levers are secured to a frame 105 which is pivoted at its ends in the depending leg formations 106 of the table by means of the pivot screws 107 so that the frame and levers can pivot about the axis E—E, Figure 9.

The levers 104 extend into the space in the frame 105 and located between such extensions and pivoted thereto by pivot screws 108 is a bar 109. The pivotal axis of this bar 109 is about the line F—F, Figure 9. The bar 109 is connected by spaced anchor rods 110 to the anchorage plate 111 against which collars 142 on micro stops 143 are adapted to engage.

The micro stops and collars, of which only one is shown, are similar to and operate in a similar manner to the micro stops 81, 82 of the previous modification for controlling the feed of the table towards the plane of the cutting disc.

The plate 111 is pivotally mounted on a U-shaped frame 112 by pivot screws 113 and short bars 114 and 115 secured respectively to plate 111 and 112. The frame 112 is pivotally mounted by means of pivot screws 116 in the leg formations 106 of the table.

The pivotal axes of the plate 111 and frame 112 are respectively on the lines G—G and H—H of Figure 9.

The distances between the pivotal axes E—E and F—F on the one hand and G—G and H—H on the other are equal to one another, and in the present example are equal to $\frac{1}{100}$ of the length of the lever 104, i. e. from the pivotal axis E—E of the frame 105 to the pivotal axis of the abutment 103.

The abutment member 103 is loaded against the former 101 by a spring 116 secured at one end to the frame 105 and at the other to a bar 117 carried by the table structure.

The shape of the former 101 is appropriate to the form to be generated and in the form shown in Figure 10 is suitable for a blended facet diamond. The straight part of the blended facet edge conforms to the abutment member engaging both parts of the cam at the points 118. The cam is conveniently formed by two partial circular portions 119, 120 secured together by screws 121 and is held rigidly in the shaft 100 by a collar 122 against a shoulder on the shaft.

The table is counterbalanced and biased as in the previous form by weights 50, 52 acting on a pin 49 extending from the rear lower shaft 39.

When cutting or generating cylindrical surfaces on diamonds having a clearance angle with the form of the invention shown in Figures 7 to 10, it will be appreciated that the desired shape will be controlled by the shape of the cam 101 instead of by a canting of the former as described with reference to the first modification.

I claim:

1. A mechanism for cutting diamonds and the like, of the type described comprising: a machine stand, a cutting disc rotatably mounted on the stand with the cutting plane vertical, and rotary drive means for the disc; a horizontal table mounted on said stand in front of said cutting disc; a radial arm having at one end a vertical pivotal shaft mounted in bearings in said table; dop mounting means on said radial arm for holding the stone to be treated, the arrangement being such that the radial arm, dop mounting means and stone may be oscillated in an arcuate path about the axis of said pivotal shaft with the stone in cutting contact with the disc; a parallel link motion mounting for the table including horizontal shafts mounted on the machine stand, parallel links hung from said horizontal shafts, a pair of lower horizontal shafts secured to said links and leg frames secured to said table and pivotally supported on said lower horizontal shafts; modifying means for altering the path of the stone with respect to the cutting disc during oscillation of the radial arm, consisting of a former mounted on said pivotal shaft and an abutment member operatively connected to the machine stand and mounted for engagement by the former, the arrangement of the former and abutment being such that rotation of the former upon the abutment due to oscillation of the pivotal shaft and radial arm causes the displacement of the table and radial arm pivotal axis towards or away from the cutting plane to modify the said path, to afford cutting contact loci for the stone at the cutting disc as determined by said modifying means.

2. A mechanism as claimed in claim 1 including ball bearings between the lower horizontal shafts and the table leg frames, ball bearings between the machine stand and the upper horizontal shafts and a rigid connection between the links and the upper and lower horizontal shafts.

3. A mechanism as claimed in claim 1 including gravity means pivotally mounted on said machine stand, an operative connection between the gravity means and the table, whereby the gravity means tend to move the stone toward the cutting plane under the control of said modifying means which operate to displace the stone away from the cutting plane.

4. A mechanism as claimed in claim 1 including adjustable counterweight means mounted on the machine stand, an operative connection between said means and said table, said means acting in opposition to the tendency of the table to return to its normal position of rest when displaced therefrom away from the cutting disc so that the table mass is substantially balanced and imposes little or no load on the stone in contact with the cutting disc, and adjustable weight means operatively associated with said counterweight means for giving the balanced table mass a predetermined bias towards the cutting disc for loading the stone to afford a predetermined substantially constant cutting pressure.

5. A mechanism as claimed in claim 1 including counterweight means acting in opposition to the tendency of the table to return to its normal position of rest when displaced therefrom away from the cutting disc so that the table mass is substantially balanced and imposes little or no load on the stone in contact with the cutting disc, and adjustable weight means whereby the balanced table mass is given a predetermined bias towards the cutting disc to afford a predetermined substantially constant cutting pressure, said counterweight means and said adjustable weight means comprising: an upwardly extending arm, a pivotal mounting for the arm comprising ball bearings on a bracket carried by the machine stand; a counterweight adjustably mounted on said arm; operatively engaging parts on the table link structure and on the counterweight arm below its pivot; a horizontal bar carried by said arm extending on each side of the pivot thereof, and bias weights adjustably mounted on said bar.

6. A mechanism as claimed in claim 1 wherein the abutment member of the modifying means is carried on the parallel link motion mounting for the table and adjustably anchored means operatively connects the abutment to the machine stand.

7. A mechanism as claimed in claim 1 including a pair of levers extending upwardly from the said lower horizontal shafts and linked together at their upper ends, said abutment member being pivoted horizontally on one of said levers, a block pivotally mounted on the other of said levers and adjustable micrometer screw means carried by the machine stand and operatively connected to said block in the horizontal plane of the pivot axis of the abutment member.

8. A mechanism as claimed in claim 1 wherein said upper and lower horizontal shafts lie in a pair of parallel horizontal planes, the former supported on the radial arm pivotal shaft being located in a horizontal plane between said planes.

9. A mechanism as claimed in claim 1 including a cylindrical former, mounting means for the former comprising: a sleeve fixed to the radial arm pivotal shaft, a spherical exterior portion on said sleeve; a second sleeve surrounding and engaging said spherical portion, said cylindrical former being mounted on said second sleeve, a forked member connected to the former mounting sleeve, a stub shaft on said forked member the axis of said stub shaft being at right-angles to and passing through the pivotal shaft axis; a bracket secured upon the pivotal shaft and in which the stub shaft is rotatably supported; and an arm on said stub shaft by which it and the cylindrical former may be turned about the stub shaft axis in reference to a scale to incline the axis of the cylindrical former with respect to the axis of the pivotal shaft of the radial arm.

10. A mechanism as claimed in claim 1 including a former cam fixed on the lower part of the radial arm pivotal shaft, a mounting comprising a lever structure on one end of which the abutment is mounted, said lever structure having a horizontal fulcrum pivot, micro screw means for adjustably connecting the lever structure to the machine stand in the plane of said horizontal fulcrum axis, and the other end of the lever structure being connected to the table structure through a horizontal pivot, the arrangement being such that the displacements produced by the cam acting against the abutment cause reduced displacements of the table and radial arm pivotal shaft in proportion to the leverage of the lever structure carrying the abutment member.

11. A mechanism as claimed in claim 1 including a former cam fixed on the lower part of the radial arm pivotal shaft, a lever structure on one end of which the abutment member is pivotally mounted, an anchorage plate on which said lever structure is pivoted on a horizontal axis, adjustable micro screw means carried by the machine stand and operatively connected to said anchorage plate, a plate frame on which the anchorage plate is horizontally pivoted, horizontal pivots in the table leg structure for said plate frame, the pivotal axes of the anchorage plate and plate frame being respectively in the horizontal plane of the axis of the fulcrum of the abutment lever structure, and in the horizontal plane of the axis of the abutment lever structures.

12. A mechanism as claimed in claim 1 including an abument member comprising a rectilinear bar of square cross section, pivotal mountings for the ends of said bar to permit the turning of the bar to bring different faces of the square form into contact with the former in succession as wear occurs.

13. A mechanism as claimed in claim 1 including a driving shaft for oscillating the pivotal shaft and radial arm, said driving shaft positioned substantially in axial alignment with the pivotal shaft, a friction clutch for communicating motion of the drive shaft to the pivotal shaft whereby relative movement between the shafts may occur should the pivotal shaft be arrested, and an Oldham coupling between the shafts to accommodate any irregularities of alignment between the driving shaft and the pivotal shaft.

FREDERICK CHARLES JEARUM.

REFERENCES CITED

The following references are of record in the file of this patent:

UNITED STATES PATENTS

| Number | Name | Date |
| --- | --- | --- |
| 2,246,023 | Spurling | June 17, 1941 |
| 1,461,149 | Hunt | July 10, 1923 |
| 109,325 | Knight | Nov. 15, 1870 |
| 1,608,374 | Desjardins | Nov. 23, 1926 |
| 821,849 | Benicke | May 29, 1906 |
| 2,384,253 | Jearum | Sept. 4, 1945 |

FOREIGN PATENTS

| Number | Country | Date |
| --- | --- | --- |
| 116,774 | Australia | Mar. 31, 1943 |